DANIEL A. JOHNSON.

Improvement in Thill Coupling.

No. 123,909.     Patented Feb. 20, 1872.

Witnesses,
W. J. Cambridge
E. B. Whittier

Inventor
Daniel A. Johnson
Per his Attorneys
Teschemacher & Stearns.

123,909

UNITED STATES PATENT OFFICE.

DANIEL A. JOHNSON, OF BOSTON, MASSACHUSETTS.

IMPROVEMENT IN THILL-COUPLINGS.

Specification forming part of Letters Patent No. 123,909, dated February 20, 1872.

*To all whom it may concern:*

Be it known that I, DANIEL A. JOHNSON, of Boston, in the county of Suffolk and State of Massachusetts, have invented certain Improvements in Thill-Couplings, of which the following is a full, clear, and exact description, reference being had to the accompanying drawing making part of this specification, in which—

Figure 1:
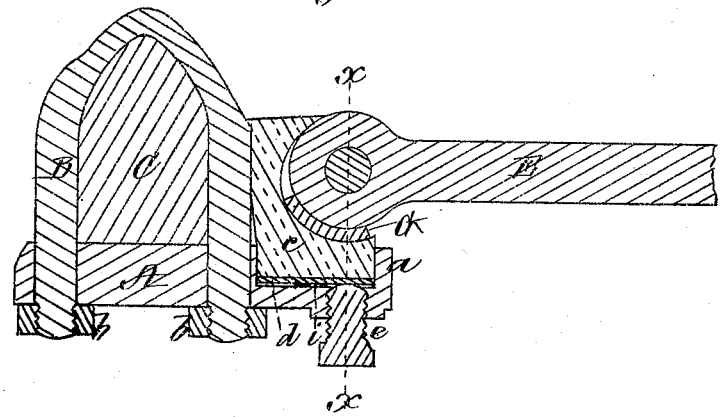
Figure 2:
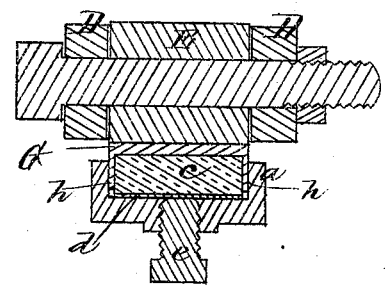
Figure 3:
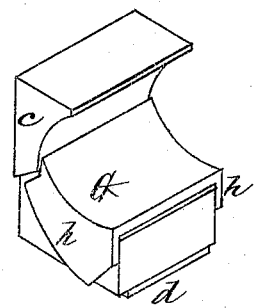
Figure 4:
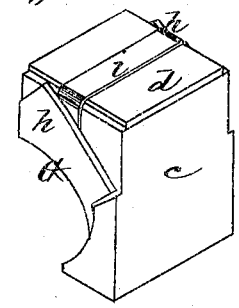

Figure 1 is a central longitudinal section through a thill-coupling having my improvements applied thereto. Fig. 2 is a transverse section on the line $x\ x$ of Fig. 1; Fig. 3, a perspective view of the upper side of the elastic packing and my improved guard-plate covering the same; Fig. 4, a perspective view of the lower side of the elastic packing with my improved strap in place.

My present invention relates to that class of thill-couplings in which an elastic packing is employed. This packing is soon worn out and rendered useless by being rolled under by the movement or friction of the thill-iron thereon. The attempt has been made to overcome this objection by interposing a thin metallic plate between the packing and thill-iron; but, owing to the form of the plate and the insecure manner in which it was applied, both the rubber and plate were rolled under and broken. My invention consists in a metallic guard or covering plate provided with ears or side pieces, which extend down into the socket which supports the rubber packing, whereby it is partially inclosed and effectually prevented from expanding laterally and rolling under as heretofore; the plate, on account of its peculiar form, being also prevented from being bent and displaced. My invention also consists in a strap for holding the movable plate, upon which the packing rests, in place between the side pieces of the guard-plate.

To enable others skilled in the art to understand and use my invention, I will proceed to describe the manner in which I have carried it out.

In the said drawing, A is the yoke of the coupling, the forward part of which is provided with a socket, $a$. B is the band which surrounds the axle C, the ends of the band passing through the rear portion of the yoke A, to which they are secured by nuts $b$. D D are lugs, projecting from the band B above the socket $a$, between which lugs is pivoted the thill-iron E. $c$ is the rubber packing, of the form seen, which rests in the socket $a$ on a plate, $d$, which is forced up, to compress the packing, by a set-screw, $e$, passing up through the bottom of the socket. Over the lower portion of the rubber packing is fitted a metallic guard or covering plate, G, provided with side pieces or ears $h$, which extend only part way down into the socket so as not to interfere with the yielding of the guard-plate. The upper side of the guard-plate is made concave, so as to fit snugly against the under side of the end of the thill-iron, and when the rubber is compressed by means of the screw, the parts are prevented from rattling and consequent wear. The side pieces of the guard-plate A, extending down into the socket, serve to prevent the guard-plate from moving therein, and the plate is always kept in position upon the packing, which is thus prevented from expanding laterally and being displaced and rolled under as heretofore, while the plate is free to yield in a vertical direction, and it is of such strength that it cannot be bent or rolled out of the socket. $i$ is a thin metallic band or strap, which secures the plate $d$ to the rubber packing $c$, and prevents the former from moving laterally beneath one of the ears $h$, which would limit the amount of the vertical play of the guard or covering plate G.

*Claim.*

What I claim as my invention, and desire to secure by Letters Patent, is—

1. The metallic guard or covering plate G with its ears or side pieces $h$, in combination with the rubber packing $c$, plate $d$, and socket $a$, substantially as and for the purpose set forth.

2. I also claim the strap $i$ for holding the plate $d$ between the ears or side pieces $h$ of the guard-plate G, substantially as described.

Witness my hand this 15th day of January, 1872.

DANIEL A. JOHNSON.

In presence of—
 N. W. STEARNS,
 W. J. CAMBRIDGE.